A. H. BOURNE.

CHIMNEY AND VENTILATING FLUES.

No. 7,350. Reissued Oct. 17, 1876.

*Witnesses.*

Solon C. Kemon

Edw. W. Byrn.

*Inventor.*

A. H. Bourne

By Munn & Co

Attorneys

N. PETERS, PHOTO-LITHOGRAPHER, WASHINGTON, D. C.

UNITED STATES PATENT OFFICE.

AMOS H. BOURNE, OF FORT SCOTT, KANSAS.

IMPROVEMENT IN CHIMNEY AND VENTILATING FLUES.

Specification forming part of Letters Patent No. 179,768, dated July 11, 1876; reissue No. 7,350, dated October 17, 1876; application filed September 30, 1876.

*To all whom it may concern:*

Be it known that I, AMOS H. BOURNE, of Fort Scott, in the county of Bourbon and State of Kansas, have invented a new and useful Improvement in Chimney and Ventilating Flues; and I do hereby declare that the following is a full, clear, and exact description of the same.

My invention consists of a chimney and ventilating flue constructed of plastic material, the smoke-flue being, by preference, a clay pipe, which is placed in the center of the ventilator, which latter is a cement case surrounding the pipe, and having, say, four ventilating-passages, between which the cement is formed into ribs that fit close to the pipe for supporting it, and extending around clay pipe are one or more grooves to secure it in place substantially. The exterior case, with passages, is for protecting the building from the heat of the smoke-pipe, and securing a uniform temperature of the chimney.

The pipe is first made in any approved way with the grooves, and is then set on end, say, with four cores of iron or wood applied to the sides at proper distances apart, leaving the grooves exposed. The cement case is then packed around it in a curb, confining it temporarily. The cores are then withdrawn, and when it sets the curb is removed, leaving the cement case united to the pipe by ribs fitting in the grooves, and by contact of other ribs against the sides.

Stove-pipe and ventilating thimbles will be fitted in as required, when the cement case is built up.

The chimney and ventilating flue will be built up in sections to any required height, and the top will be finished in any ornamental form.

Figure 1:
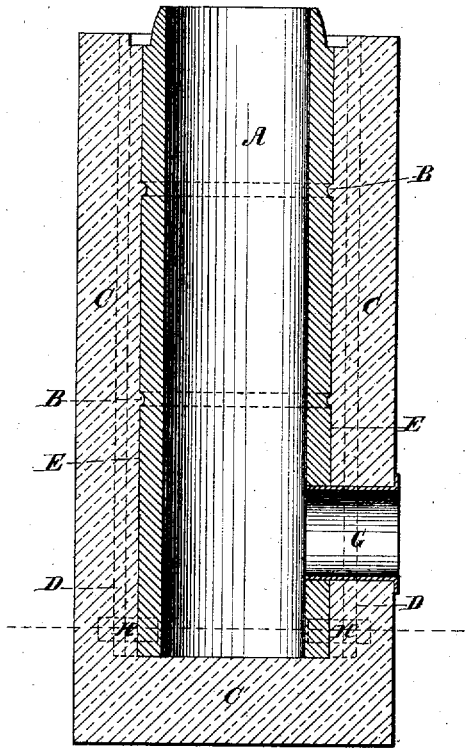
Figure 2:
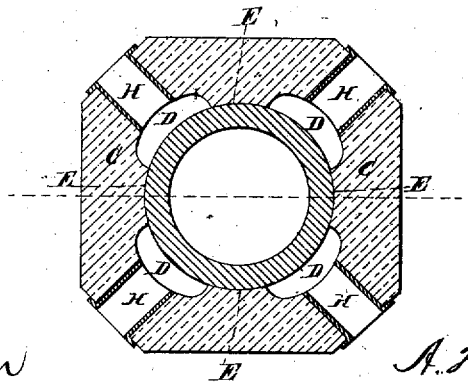

Figure 1 is a sectional elevation of my improved chimney and ventilator, taken on line *x x* of Fig. 2; and Fig. 2 is a horizontal section taken on line *y y* of Fig. 1.

Similar letters of reference indicate corresponding parts.

A is the smoke pipe, which is to be made of clay or cement of any approved kind, which can be molded in a plastic state and will set hard in a short time, the said pipe being made with grooves B. C is the case, of cement or other material built around the pipe on cores forming the ventilating-flues D and ribs E fitting against the sides of the pipe, and in the grooves B. G is the stove-pipe thimble, and H thimbles forming openings into the ventilating-passages. Besides being good ventilators, the ventilating-passages serve for cooling the air-currents, keeping the pipe cool.

I am aware that a cement-pipe chimney is not new, but the heat and gases disintegrate the cement, so that it crumbles; also, that a clay-pipe chimney is not new, but rapid contraction and expansion crack it. Therefore, neither is safe or durable; but, by making one protect the other, I overcome these difficulties.

Having thus described my invention, I claim as new and desire to secure by Letters Patent—

The combination, with clay-pipe A, having grooves B, of the cement-case C, built on cores that form flues D, and provided with ribs E, substantially as and for the purposes specified.

AMOS H. BOURNE.

Witnesses:
O. A. CHENEY,
W. J. BOWDEN.